(12) United States Patent
Su et al.

(10) Patent No.: US 10,314,135 B2
(45) Date of Patent: Jun. 4, 2019

(54) LED RETROFIT LAMP HAVING ACTIVE OVER-CURRENT PROTECTION CIRCUIT

(71) Applicant: SIGNIFY HOLDING B.V., Eindhoven (NL)

(72) Inventors: Borong Su, Eindhoven (NL); Bernhard Christiaan van Dijk, Geldrop (NL); William Peter Mechtildis Marie Jans, Born (NL); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 14/907,994

(22) PCT Filed: Aug. 27, 2014

(86) PCT No.: PCT/EP2014/068200
§ 371 (c)(1),
(2) Date: Jan. 27, 2016

(87) PCT Pub. No.: WO2015/028526
PCT Pub. Date: Mar. 5, 2015

(65) Prior Publication Data
US 2016/0174329 A1 Jun. 16, 2016

(30) Foreign Application Priority Data

Aug. 27, 2013 (EP) .................................... 13181862

(51) Int. Cl.
*H05B 33/08* (2006.01)

(52) U.S. Cl.
CPC ..... *H05B 33/0887* (2013.01); *H05B 33/0845* (2013.01); *Y02B 20/341* (2013.01); *Y02B 20/383* (2013.01)

(58) Field of Classification Search
CPC combination set(s) only.
See application file for complete search history.

(56) References Cited

U.S. PATENT DOCUMENTS

| 6,388,393 B1 | 5/2002 | Illingworth | |
|---|---|---|---|
| 2010/0207536 A1* | 8/2010 | Burdalski | H05B 33/0815 315/224 |

(Continued)

FOREIGN PATENT DOCUMENTS

| EP | 2257128 A2 | 12/2010 |
|---|---|---|
| EP | 2405719 A1 | 1/2012 |

(Continued)

OTHER PUBLICATIONS

Nan, "A driving technology for retrofit LED lamp for flourescent lighting fixtures with electronic ballasts", IEEE Xplore Digital Library Abstract.

*Primary Examiner* — Douglas W Owens
*Assistant Examiner* — Jianzi Chen
(74) *Attorney, Agent, or Firm* — Akarsh P. Belagodu

(57) ABSTRACT

The present invention relates to an LED retrofit lamp (1) for being connected to a high frequency electronic ballast (26), the high frequency electronic ballast (26) being adapted for providing a voltage and a current to the LED retrofit lamp (1). The LED retrofit lamp (1) comprises an LED unit (4), an adapting unit (30) for adapting the voltage and the current provided by the high frequency electronic ballast (26) to a voltage and a current for operating the LED unit (4), a detecting unit (40) for detecting an electrical value that depends on the current provided by the high frequency electronic ballast (26), and a ballast protection unit (60) for performing, in dependence of the detected electrical value, an operation for protecting the high frequency electronic ballast (26) from an overcurrent situation. This allows (Continued)

avoiding an unsafe situation, such as when the high frequency electronic ballast (26) is overheated.

18 Claims, 5 Drawing Sheets

(56) References Cited

U.S. PATENT DOCUMENTS

2013/0076255 A1 3/2013 Dae-Sung
2014/0300274 A1* 10/2014 Acatrinei .......... H05B 33/0815
                                                                              315/85

FOREIGN PATENT DOCUMENTS

| EP | 2469984 A2 | 6/2012 |
| JP | 2011171241 A | 9/2011 |
| WO | 2011050597 A1 | 5/2011 |
| WO | 2011063302 A2 | 5/2011 |
| WO | 2011155712 A2 | 12/2011 |
| WO | 2013024389 A1 | 2/2013 |

* cited by examiner

US 10,314,135 B2

LED RETROFIT LAMP HAVING ACTIVE OVER-CURRENT PROTECTION CIRCUIT

CROSS-REFERENCE TO PRIOR APPLICATIONS

This application is the U.S. National Phase application under 35 U.S.C. § 371 of International Application No. PCT/EP2014/068200, filed on Aug. 27, 2014, which claims the benefit of European Patent Application No. 13181862.7 filed on Aug. 27, 2013. These applications are hereby incorporated by reference herein.

FIELD OF THE INVENTION

The present invention generally relates to the field of lighting and more particularly an LED retrofit lamp for being connected to a high frequency electronic ballast. The present invention relates further to a lighting system comprising a high frequency electronic ballast and the LED retrofit lamp and to a method of operating an LED retrofit lamp for being connected to a high frequency electronic ballast.

BACKGROUND OF THE INVENTION

Recently, lighting devices have been developed that make use of light emitting diodes (LEDs) for a variety of lighting applications. Owing to their long lifetime and high energy efficiency, LED lamps are now also designed for replacing traditional incandescent and fluorescent lamps, i.e., for retrofit applications. For such applications, the LED retrofit lamp is typically adapted to fit into the socket of the respective lamp fixture to be retrofitted. Moreover, since the maintenance of a lamp is typically conducted by a user, the LED retrofit lamp should ideally be readily operational with any type of suitable fixture without the need for re-wiring the fixture. In particular, it is desirable to also reuse the ballasts that are already in place in the fixtures in order to ease the installation procedure.

LEDs typically exhibit a higher luminous efficacy than common light sources and thus draw less current from a power supply for a given luminuous flux. While this fact is advantageous for the present efforts of energy conservation, difficulties may arise when retrofitting a lamp fixture that is designed for a nominal power. For this reason, an LC circuit is typically added to the LED retrofit lamp in order to adapt the current and the voltage provided by the ballast to the LED retrofit lamp. However, some high frequency electronic ballasts that comprise a (passive) power factor correction (PFC) unit may have notably different output characteristics when they are connected to the LC circuit comprised by LED retrofit lamp. For instance, it may be that the current provided by the high frequency electronic ballast is considerably increased. This means that also the current flowing through the resonant inductor of the LC resonant circuit comprised by the high frequency electronic ballast, which is related to the provided current, may be increased up to a level at which it could overstress the resonant inductor. Such an overcurrent situation may result in safety problems for the high frequency electronic ballast, e.g. it may result in an overheating of the high frequency electronic ballast.

SUMMARY OF THE INVENTION

It is an object of the present invention to provide an LED retrofit lamp for being connected to a high frequency electronic ballast, which allows protecting the high frequency electronic ballast from a possible overcurrent situation. It is a further object of the present invention to provide a lighting system comprising a high frequency electronic ballast and the LED retrofit lamp and a method of operating an LED retrofit lamp for being connected to a high frequency electronic ballast.

In a first aspect of the present invention, an LED retrofit lamp for being connected to a high frequency electronic ballast, the high frequency electronic ballast being adapted for providing a voltage and a current to the LED retrofit lamp, is presented, wherein the LED retrofit lamp comprises:

an LED unit, an adapting unit for adapting the voltage and the current provided by the high frequency electronic ballast to a voltage and a current for operating the LED unit, a detecting unit for detecting an electrical value that depends on the current provided by the high frequency electronic ballast, and a ballast protection unit for performing, in dependence of the detected electrical value, an operation for protecting the high frequency electronic ballast from an overcurrent situation.

It is an insight of the inventors of the present invention that the current provided by the high frequency electronic ballast to the LED retrofit lamp is related to the current flowing through the resonant inductor of the LC resonant circuit comprised by the high frequency electronic ballast when the LED retrofit lamp is connected to the high frequency electronic ballast, and that the provided current can thus be used by the LED retrofit lamp for detecting possible safety problems for the high frequency electronic ballast. By providing the LED retrofit lamp with a detecting unit for detecting an electrical value that depends on the current provided by the high frequency electronic ballast and a ballast protection unit for performing, in dependence of the detected electrical value, an operation for protecting the high frequency electronic ballast from an overcurrent situation, it is thus possible—according to the above-described insight—to protect the high frequency electronic ballast in the case of a possible overcurrent situation of the high frequency electronic ballast. This allows avoiding an unsafe situation, such as when the high frequency electronic ballast is overheated.

The LED unit may preferably comprise any type of solid state light source, such as an inorganic LED, organic LED, or a solid state laser, e.g., a laser diode. For general lighting applications, the LED unit may preferably comprise at least one high-power LED, i.e., having a luminous flux of more than 1 lm. For retrofit applications, it is especially preferred that the total flux of the LED unit is in the range of 300 lm to 10000 lm, which corresponds to a typical 5 W to 80 W fluorescent tube lamp. Most preferably, the forward voltage of the LED unit is in the range of 30 V to 200 V, particularly 50 V to 100 V for a 4-foot-lamp (1 foot=0.3048 m).

The LED unit may certainly comprise further electric or electronic components, such as an LED driver unit, e.g., to set the brightness and/or color, rectifying circuitry, a smoothing stage, a filter capacitor and/or a discharging protection diode. The LED unit may comprise more than one LED, for example in applications where colour-control of the emitted light is desired, e.g., using RGB-LEDs, or to further increase the luminous flux of the LED lamp. Furthermore, the LED lamp may comprise more than one LED unit.

The LED retrofit lamp may be adapted to be connected to a PL-type fluorescent lamp fixture. However, preferably, the LED retrofit lamp comprises at least a first and second lamp caps. The lamp caps should be adapted to provide an electrical connection of the LED unit with the respective lamp fixture and thus with power. The lamp caps may thus for example be provided with a corresponding contact element, such as a bi-pin base. For example, the lamp caps may have the electrical and/or mechanical properties of a T5 or T8-fluorescent lamp.

Preferably, the LED retrofit lamp is an LED retrofit tube lamp, such as a linear tube lamp. Most preferably, the LED retrofit lamp is a double-capped tube lamp, e.g., having a first and second lamp cap, arranged on opposing ends of a housing.

It is preferred that the adapting unit comprises an LC circuit comprising an inductor and a capacitor. Such an LC circuit provides a very simple and inexpensive way of adapting the voltage and the current provided by the high frequency electronic ballast to a voltage and a current for operating the LED unit.

It is further preferred that the inductor of the LC circuit comprises an auxiliary winding and the detected electrical value is a voltage value derived from a voltage at the auxiliary winding. The inventors of the present invention have further realized that, if the operating frequency of the high frequency electronic ballast is stable (or only varies in a limited range), which is in general the case, the current flowing through the inductor of the LC circuit comprised by the LED retrofit lamp is related to the current provided by the high frequency electronic ballast and thus to the current flowing through the resonant inductor of the LC resonant circuit comprised by the high frequency electronic ballast. Since the voltage at the auxiliary winding indirectly reflects the current flowing through the auxiliary winding, also the voltage at the auxiliary winding can be used as a basis for detecting a possible overcurrent situation of the high frequency electronic ballast.

It is further preferred that the detecting unit comprises a rectifier circuit and a buffer capacitor.

It is preferred that the detecting unit comprises a diode for absorbing transient current spikes supplied by the high frequency electronic ballast to the LED retrofit lamp during a startup state. Providing such a diode allows to distinguish a situation in which the current flowing through the resonant inductor of the LC resonant circuit comprised by the high frequency electronic ballast is only temporarily increased during a startup state—which may not require protection of the high frequency electronic ballast—from a situation in which the current is permanently increased up to a level at which it could overstress the resonant inductor which requires protection of the high frequency electronic ballast. An exemplary diode that may advantageously be used in the detecting unit for this purpose is a voltage regulator diode, such as the model BZX384-C15 from NXP Semiconductors.

It is further preferred that the detecting unit comprises a voltage divider circuit. The voltage divider circuit may comprise a first and a second resistor, which are connected in a series configuration parallel to the diode. The first and the second resistor further divide the voltage at the buffer capacitor and are dimensioned such that the voltage at the first resistor is less than a predetermined threshold, e.g., 2.5 V, when the high frequency electronic ballast works in a normal state, i.e., when the current flowing through the resonant inductor of the LC resonant circuit comprised by the high frequency electronic ballast is below a value critical for the safety of the high frequency electronic ballast.

It is preferred that the detecting unit comprises a low-pass filter circuit comprising a resistor and a capacitor. The low-pass filter circuit may be used for low-pass filtering—and thus dampening—the divided voltage at the first resistor of the voltage divider circuit. The resistor and the capacitor of the low-pass filter circuit preferably form a delay circuit, wherein a delay of the delay circuit is in a range between 0.02 and 5 seconds, preferably between 0.1 and 1 seconds, and most preferably 0.33 seconds. Therewith, the voltage value at the capacitor of the low-pass filter circuit reflects an average of the current flowing through the inductor of the LC circuit comprised by the LED retrofit lamp.

It is further preferred that the ballast protection unit comprises a shunt regulator for triggering the operation for protecting the ballast if the detected electrical value exceeds a predetermined threshold. An exemplary shunt regulator that may advantageously be used in the ballast protection unit for this purpose is a three-terminal programmable shunt regulator, such as the TL431 from Texas Instruments. The shunt regulator may be configured such that if the voltage value at the capacitor of the low-pass filter circuit exceeds the predefined threshold, e.g, the above 2.5 V, which indicates that the high frequency electronic ballast works in an abnormal state in which the current flowing through the resonant inductor of the LC resonant circuit comprised by the high frequency electronic ballast represents a possible safety issue, the shunt regulator is turned-on (i.e., the voltage at its cathode reduces dramatically) and performs the triggering.

It is preferred that the ballast protection unit is adapted to electrically disconnect the LED retrofit lamp from the high frequency electronic ballast. To this end, the ballast protection unit preferably comprises a relay circuit, which may be triggered by the shunt regulator to interrupt the current if the voltage value at the capacitor of the low-pass filter circuit exceeds the predefined threshold of 2.5 V.

In a further aspect of the present invention, a lighting system is presented, wherein the lighting system comprises:
a high frequency electronic ballast, and
the LED retrofit lamp as defined in claim 1,
wherein the LED retrofit lamp is connected to the high frequency electronic ballast.

In a further aspect of the present invention, a method of operating an LED retrofit lamp for being connected to a high frequency electronic ballast, the high frequency electronic ballast being adapted for providing a voltage and a current to the LED retrofit lamp, is presented, wherein the method comprises:
adapting the voltage and the current provided by the high frequency electronic ballast to a voltage and a current for operating an LED unit, by an adapting unit,
detecting an electrical value that depends on the current provided by the high frequency electronic ballast, by a detecting unit, and
performing, in dependence of the detected electrical value, an operation for protecting the high frequency electronic ballast from an overcurrent situation, by a ballast protection unit.

It shall be understood that the LED retrofit lamp of claim 1, the lighting system of claim 14, and the method of operating an LED retrofit lamp of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
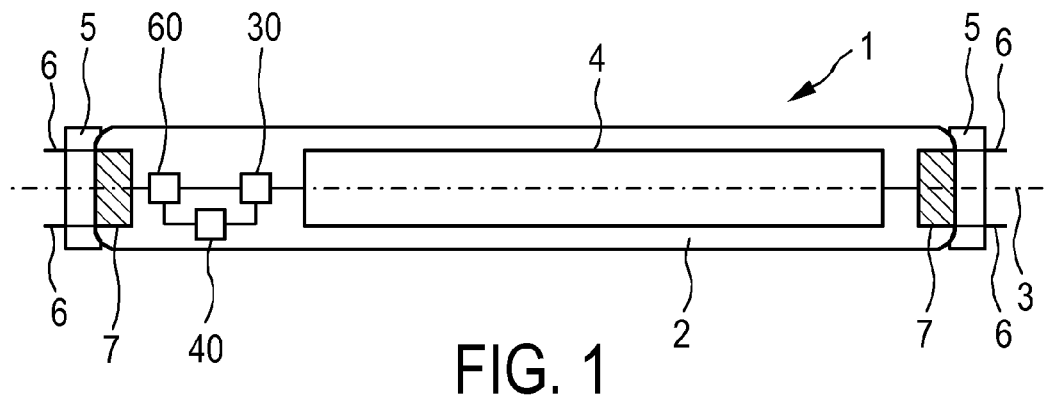
FIG. 1 shows schematically and exemplarily an embodiment of an LED retrofit lamp.

FIG. 1 shows schematically and exemplarily an embodiment of an LED retrofit lamp 1. The LED retrofit lamp 1 comprises a tube-like housing 2 that extends along a longitudinal lamp axis 3. The housing 2 is made from a transparent or translucent plastic material, e.g., a poly(methyl methacrylate) (PMMA). On each of the two longitudinal ends of the LED retrofit lamp 1, a lamp cap 5 with corresponding contact pins 6 is provided for connection to a typical lamp fixture, such as the fluorescent tube lamp (TL) fixture 20 shown in FIG. 2. Besides the electrical connection, the two lamp caps 5 also provide mechanical fixation and support of the LED retrofit lamp 1 in the respective lamp fixture 20. The LED retrofit lamp 1 is thus a retrofit lamp adapted for connection to a lamp fixture 20 for traditional fluorescent tube lamps. In the present case, the LED retrofit lamp 1 is a replacement for a typical TL-D 36 W fluorescent tube lamp, i.e., for a T8 tube having a length of approximately 120 cm.

The contact pins 6 of the LED retrofit lamp 1 are connected via filament circuits 7 to an LED unit 4, which comprises, in this embodiment, several high (or medium, or low) power LEDs (not shown separately in the figure), connected in series, as well as further electric or electronic components, such as an LED driver unit (also not shown separately in the figure). The filament circuits 7 are provided here for compatibility, safety, and reliability reasons; they provide an interface between the lamp fixture 20 and LED retrofit lamp 1 by "emulating" the filament of a traditional fluorescent tube lamp.

Figure 2:
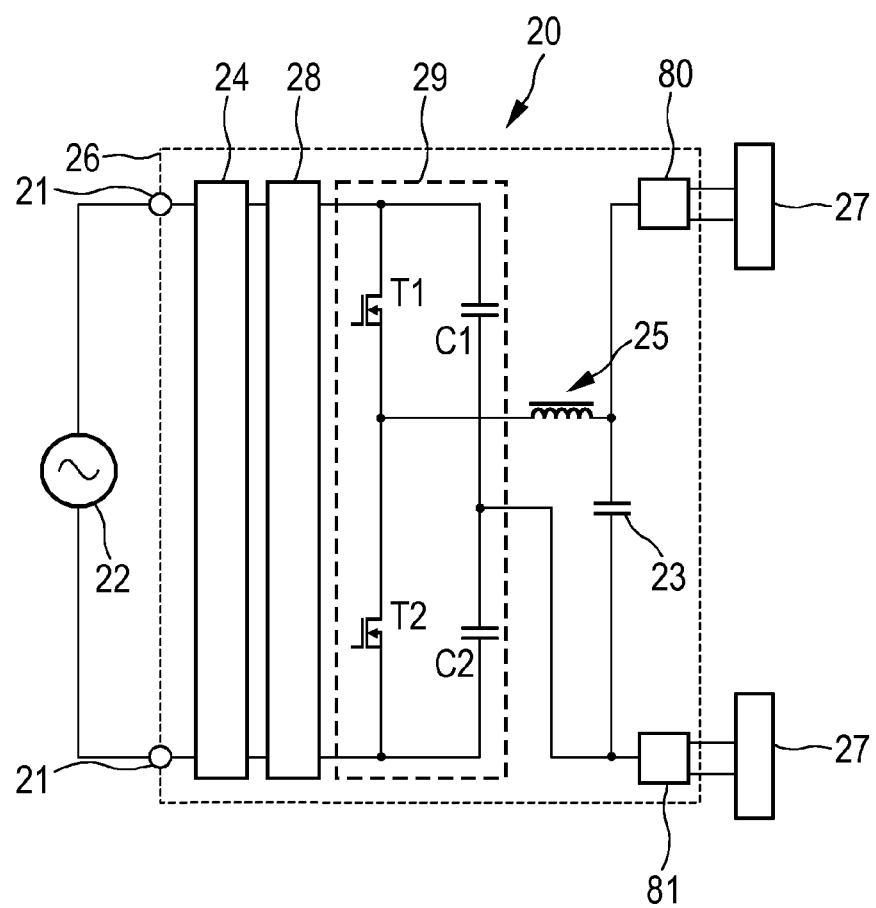
FIG. 2 shows schematically and exemplarily a circuit diagram of a lamp fixture with a high frequency electronic ballast.

FIG. 2 shows schematically and exemplarily a circuit diagram of a lamp fixture 20, here, a fluorescent tube lamp fixture, with a high frequency electronic ballast 26. The lamp fixture 20 comprises terminals 21 for connection to a mains power supply 22, such as a 120/230V AC supply line. For the connection of a lamp, such as the LED retrofit lamp 1 shown in FIG. 1, two sockets 27 are provided, which—according to the present example—are of G13 type. The sockets 27 and, thus, an installed lamp, are connected to the mains power supply 22 over the high frequency electronic ballast 26.

The high frequency electronic ballast 26 comprises an electromagnetic interference (EMI) filter unit 24, which is directly connected to the terminals 21. The EMI filter unit 24 is used to filter out high frequency harmonic components generated by the high frequency operation of the high frequency electronic ballast 26. The output of the EMI filter unit 24, here, is connected to the input of a power factor correction (PFC) unit 28, which is an intermediate stage that shapes the input current into a sine wave which is in phase with the line voltage in order to achieve a high power factor and a low total harmonic distortion. The output of the PFC unit 28 is a regulated DC voltage. The DC voltage output by the PFC unit 28 is connected to an input of a high frequency inverter unit 29, which in this example is realized as a half bridge comprising to two capacitors C1, C2 and two switches T1, T2 (shown as MOSFETs). The high frequency inverter unit 29 converts the DC voltage from the PFC unit 28 to a high frequency AC voltage by a suitable control of the two switches T1, T2. The output of the high frequency inverter unit 29 is connected via an LC resonant circuit comprising a resonant inductor 25 and a resonant capacitor 23 to the sockets 27, wherein, in this example, the high frequency electronic ballast 26 further comprises filament heating circuits 80, 81 for providing a pre-heating to the filament of a fluorescent tube lamp prior to ignition. (Some filament heating circuits are also adapted for providing a heating in the steady state.)

With returning reference to FIG. 1, the LED retrofit lamp 1 comprises an adapting unit 30 for adapting a voltage and a current provided by the high frequency electronic ballast 26 to a voltage and a current for operating the LED unit 4 of the LED retrofit lamp 1. The reason for this is that LEDs typically exhibit a higher luminous efficacy than common light sources, here, a traditional fluorescent tube lamp, and thus draw less current from a power supply for a given luminuous flux. The adapting unit 30, in this example, comprises an LC circuit comprising an inductor and a capacitor (not shown separately in the figure).

Now, when an LED retrofit lamp 1 as schematically and exemplarily described with reference to FIG. 1 is connected to a high frequency electronic ballast 26 comprising a power factor correction (PFC) unit as schematically and exemplarily described with reference to FIG. 2, the adapting unit 30 may cause the high frequency electronic ballast 26 to have a notably different output characteristic. For instance, it may be the case that the current provided by the high frequency electronic ballast 26 is considerably increased. This means that also the current flowing through the resonant inductor 25 of the LC resonant circuit comprised by the high frequency electronic ballast 26, which is related to the provided current, may be increased up to a level at which it could overstress the resonant inductor 25 (and possibly also the high frequency inverter unit 29). Such an overcurrent situation may result in safety problems for the high frequency electronic ballast 26, e.g. it may result in an overheating of the high frequency electronic ballast 26.

Figure 3:
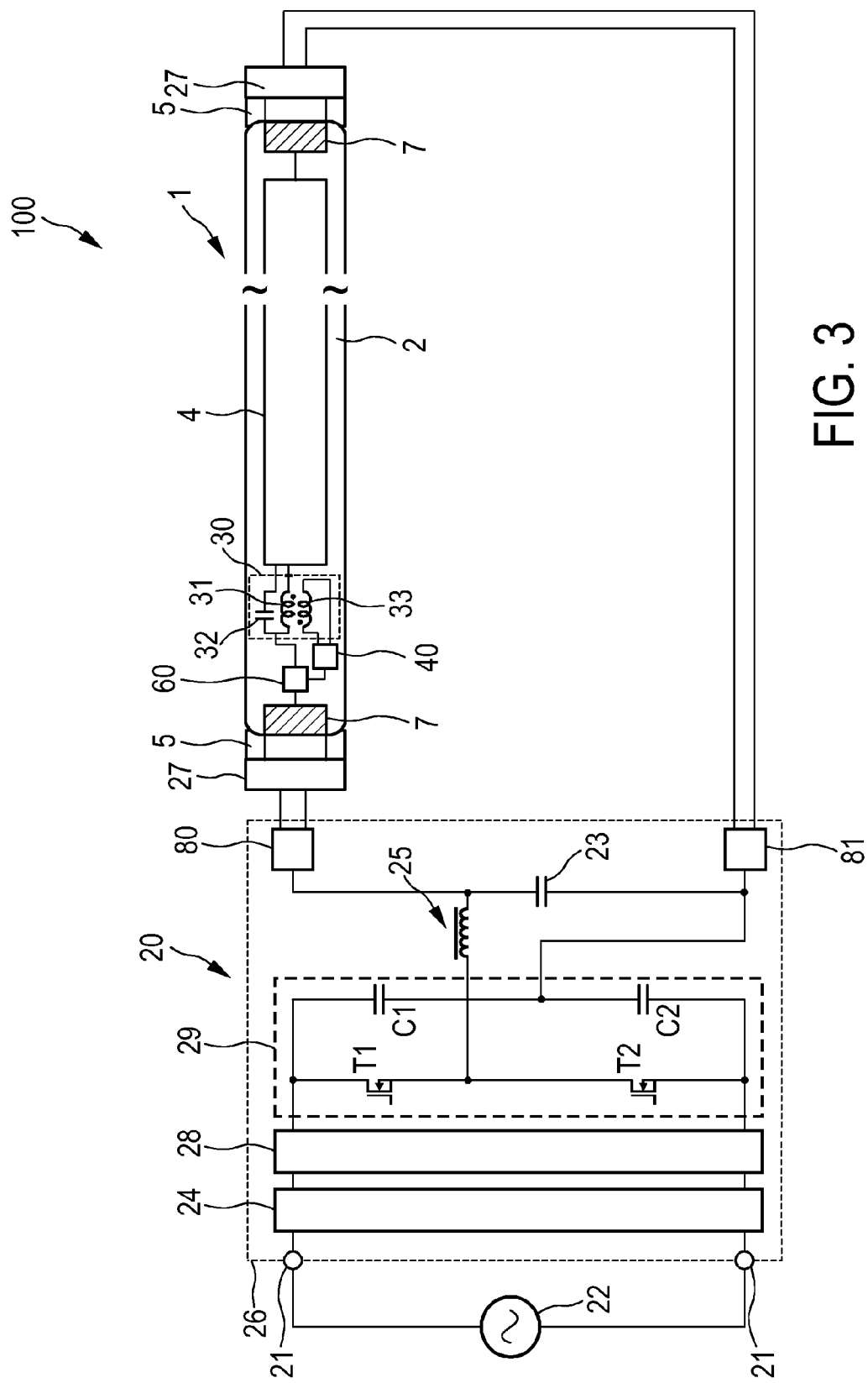
FIG. 3 shows schematically and exemplarily an embodiment of a lighting system.

For the above reasons, the LED retrofit lamp 1 comprises means 40, 60 for protecting the high frequency electronic ballast 26 in order to avoid unsafe situations that could result from an overcurrent situation of the high frequency electronic ballast 26, such as when the high frequency electronic ballast 26 is overheated. This is described in more detail in the following with reference to FIG. 3, which shows schematically and exemplarily an embodiment of a lighting system 100. In this and in the following figures, elements that are the same as or correspond to elements in FIG. 1 or 2 are provided with the same or corresponding reference signs.

The lighting system 100 comprises the high frequency electronic ballast 26 of FIG. 2 and the LED retrofit lamp 1 of FIG. 1 with the LED unit 4 and the adapting unit 30. The adapting unit 30, here, comprises an LC circuit comprising an inductor 31 and a capacitor 32 by means of which a voltage and a current output by the high frequency electronic ballast 26 are adapted to a voltage and a current for operating the LED unit 4 of the LED retrofit lamp 1. Furthermore, the LED retrofit lamp 1 comprises a detecting unit 40 for detecting an electrical value that depends on the current provided by the high frequency electronic ballast 26 and a ballast protection unit 60 for performing, in dependence of the detected electrical value, an operation for protecting the ballast 26 from an overcurrent situation. In this embodiment, the inductor 31 of the LC circuit comprises an auxiliary winding 33 and the detected electrical value is a voltage value derived from a voltage V at the auxiliary winding 33.

Figure 4:
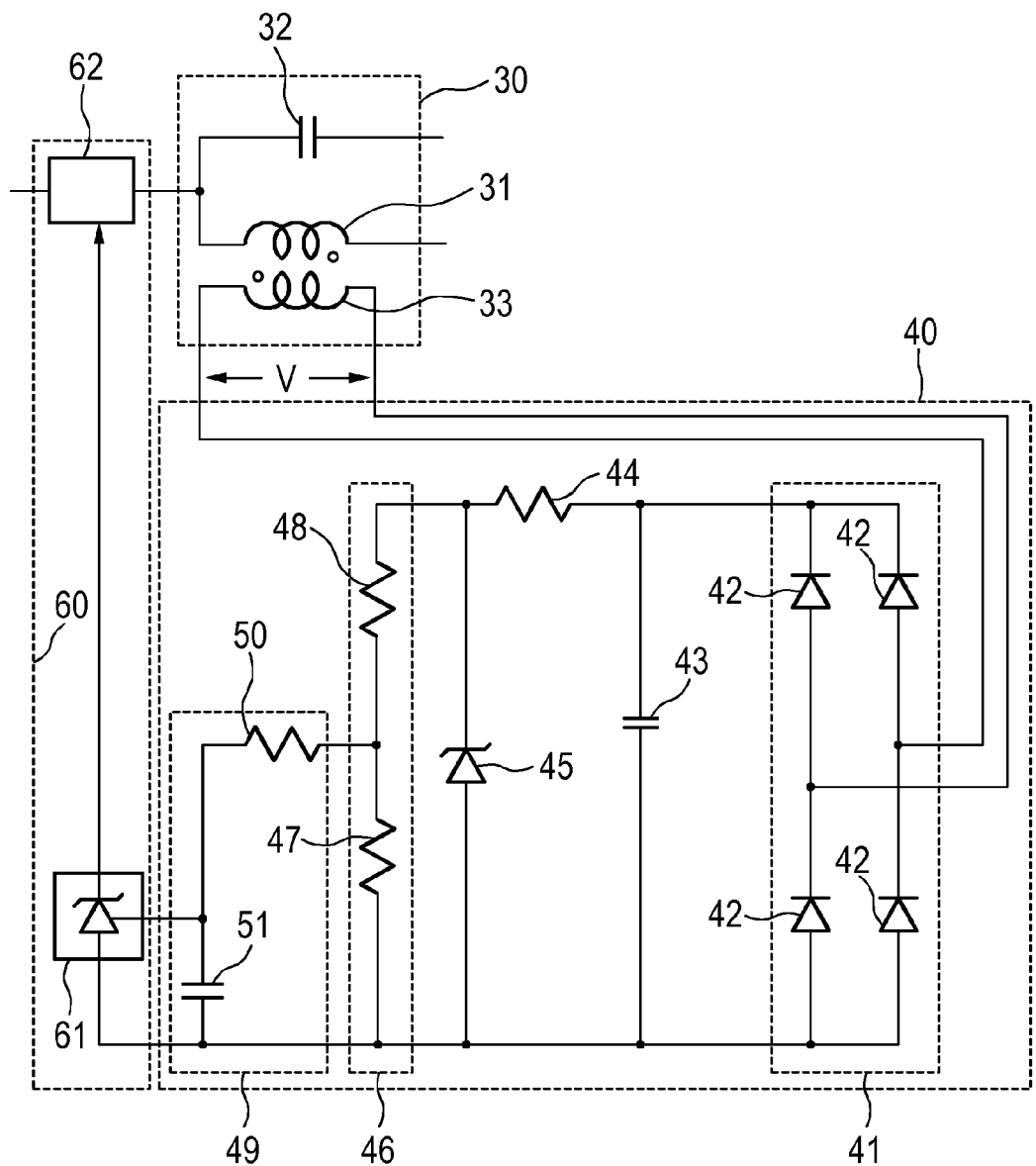
FIG. 4 shows schematically and exemplarily a more detailed view of the adapting unit, the detecting unit, and the ballast protection unit of the LED retrofit lamp shown in FIG. 3.

A more detailed view of the adapting unit 30, the detecting unit 40, and the ballast protection unit 60 of the LED retrofit lamp 1 is shown schematically and exemplarily in FIG. 4. As already explained with reference to FIG. 3 above, the adapting unit 30 comprises an LC circuit comprising an inductor 31 and a capacitor 32, wherein the inductor 31 of the LC circuit comprises an auxiliary winding 33 and the electrical value detected by the detecting unit 30 is a voltage value derived from a voltage V at the auxiliary winding 33. As described above, if the operating frequency of the high frequency electronic ballast 26 is stable (or only varies in a limited range), which is in general the case, the current flowing through the inductor 31 of the LC circuit comprised by the LED retrofit lamp 1 is related to the current provided by the high frequency electronic ballast 26 and thus to the current flowing through the inductor 25 of the LC resonant circuit comprised by the high frequency electronic ballast 26. Since the voltage V at the auxiliary winding 33 indirectly reflects the current flowing through the auxiliary winding 33, also the voltage V at the auxiliary winding can be used as a basis for detecting a possible overcurrent situation of the high frequency electronic ballast 26.

The detecting unit 40, here, comprises a rectifier circuit 41, which in this embodiment is a full-wave bridge rectifier circuit comprising four diodes 42 in a bridge configuration, and a buffer capacitor 43. The detecting unit 40 further comprises a series resistor 44 and a diode 45 for absorbing transient current spikes supplied by the high-frequency electronic ballast 26 to the LED retrofit lamp 1 during a startup state. Providing such a diode 45 allows to distinguish a situation where the current flowing through the resonant inductor 25 of the LC resonant circuit comprised by the high frequency electronic ballast 26 is only temporarily increased during a startup state—which may not require protection of the high frequency electronic ballast 26—from a situation where the current is permanently increased up to a level at which it could overstress the resonant inductor 25—which requires protection of the high frequency electronic ballast 26. An exemplary diode 45 that may advantageously be used in the detecting unit 40 for this purpose is a voltage regulator diode, e.g., a zener diode, such as the model BZX384-C15 from NXP Semiconductors. The detecting unit 40 further comprises a voltage divider circuit 46, here, comprising a first and a second resistor 47, 48, which are connected in a series configuration parallel to the diode 45. The first and the second resistor 47, 48 further divide the voltage at the buffer capacitor 43 and are dimensioned such that the divided voltage at the first resistor 47 is less than a predetermined threshold, here, 2.5 V, when the high frequency electronic ballast 26 works in a normal state, i.e., when the current flowing through the resonant inductor 25 of the LC resonant circuit comprised by the high frequency electronic ballast 26 is below a value critical for the safety of the high frequency electronic ballast 26. In this example, the divided voltage at the first resistor 47 is further low-pass filtered by a low-pass filter circuit 49, which is comprised by the detecting unit 40 and comprises a resistor 50 and a capacitor 51. The purpose of the low-pass filter circuit 49 is to dampen the divided voltage at the first resistor 47. The resistor 50 and the capacitor 51 of the low-pass filter circuit 49 form a delay circuit. A delay of the delay circuit is in a range between 0.02 and 5 seconds, preferably between 0.1 and 1 seconds, and most preferably 0.33 seconds. Therewith, the voltage value at the capacitor 51 of the low-pass filter circuit 49 reflects an average of the current flowing through the inductor 31 of the LC circuit comprised by LED retrofit lamp 1.

The ballast protection unit 60 comprises a shunt regulator 61 for triggering the operation for protecting the high frequency electronic ballast 26 if the detected electrical value exceeds a predetermined threshold. An exemplary shunt regulator 61 that may advantageously be used in the ballast protection unit 60 for this purpose is a three-terminal programmable shunt regulator, such as the TL431 from Texas Instruments. The shunt regulator 61 is configured in this embodiment such that if the voltage value at the capacitor 51 of the low-pass filter circuit 49 exceeds the predefined threshold, here, the above 2.5 V, which indicates that the high frequency electronic ballast 26 works in an abnormal state in which the current flowing through the resonant inductor 25 of the LC resonant circuit comprised by the high frequency electronic ballast 26 represents a possible safety issue, the diode 61 is turned-on (i.e., the voltage at its cathode reduces dramatically) and performs the triggering.

Here, the ballast protection unit 60 is adapted to electrically disconnect the LED retrofit lamp 1 from the high frequency electronic ballast 26. To this end, the ballast protection unit 60 comprises a relay circuit 62, which in this embodiment is triggered by the shunt regulator 61 if the voltage value at the capacitor 51 of the low-pass filter circuit 49 exceeds the predefined threshold of 2.5 V.

The following Table 1 provides exemplary ratings for the main components of the above-described detecting unit 40.

TABLE 1

Exemplary ratings for the main components of the detecting unit 40

| | |
|---|---|
| Buffer capacitor 43 | 2.2 µF/50 V |
| Series resistor 44 | 4.7 kΩ |
| First resistor 47 | 6.8 kΩ |
| Second resistor 48 | 33 kΩ |
| Resistor 50 | 33 kΩ |
| Capacitor 51 | 10 µF |

In order to verify the principle underlying the present invention, the inventors have performed a number of experiments, in which they have tested an LED retrofit lamp with an adapting unit (here, an LC circuit comprising an inductor and a capacitor) with various high frequency electronic ballasts from a number of different manufacturers, including PHILIPS, OSRAM, HELVAR, TRIDONIC ATCO, and VOSSLOH-SCHABE, as well as an IEC reference ballast. For detecting the voltage at the auxiliary winding of the inductor, a circuit similar to that shown in FIG. 4 was used; however, instead of the components 44 to 51 comprised by the circuit shown in FIG. 4, only a 10 kΩ resistor was provided in parallel to the 2.2 μF/50V buffer capacitor.

The circuit was used in the experiments to measure the voltage at the buffer capacitor as shown in the third column of the following Table 2. In addition, also the current flowing through the inductor of the LC circuit comprised by the LED retrofit lamp was measured as shown in the fourth column of Table 2. As can be seen from the table, the inductor current was highest (687 mA RMS) for the EB-S 136 TLD 220-240V 50/60 Hz ballast, which is a high frequency electronic ballast with a (passive) power factor correction (PFC) unit from PHILIPS. As further evidenced by the measurement results, this ballast also gives the highest value (18.2 V) for the voltage measured at the buffer capacitor. From the measurement results acquired with the other ballasts, it may be determined that a typical "safe" inductor current in this example (here, a 4-foot lamp) would be below a maximum of about 450 mA RMS. In order to be able to protect the EB-S 136 TLD 220-240V 50/60 Hz ballast from an overcurrent situation when the LED retrofit lamp is connected to it, the resistors 47, 48 in the voltage divider circuit 46 shown in FIG. 4 may then be dimensioned such that the voltage value at the capacitor 51 of the low-pass filter circuit 49 exceeds 2.5 V when the LED retrofit lamp is operated on the EB-S 136 TLD 220-240V 50/60 Hz ballast.

TABLE 2

Experimental results

| Ballast | Manufacturer | Voltage (V) | Inductor current (mA RMS) |
| --- | --- | --- | --- |
| HF-B 136 TL-D | PHILIPS | 8.3 | 365 |
| HF-B 136 TL-D EII 220-240 V 50/60 Hz | PHILIPS | 8.8 | 338 |
| HF-S 136 TL-D II 220-240 V 50/60 Hz | PHILIPS | 9.02 | 309 |
| HF-P 136 TL-D III 220-240 V 50/60 Hz IDC | PHILIPS | 8.83 | 344 |
| HF-R 136 TLD | PHILIPS | 8.61 | 350 |
| EB-S 136 TLD 220-240 V 50/60 Hz | PHILIPS | 18.2 | 687 |
| QT-FIT8 1x36 | OSRAM | 8.92 | 418 |
| QTP8 1x36/230-240 | OSRAM | 7.97 | 420 |
| EL1x36/40/18s | HELVAR | 10.52 | 366.3 |
| EL1x36ngn | HELVAR | 8.6 | 394 |
| PC 1/36 T8 PRO 220-240 V 50/60/0 Hz | TRIDONIC ATCO | 10.35 | 441 |
| ELXc 136.207 | VOSSLOH-SCHWABE | 8.58 | 354 |
| HF-Performer 136 TLD 220-240 V | PHILIPS | 11.27 | 363 |
| HF-Pi I 14/21/24/39 TL5 EII 220-240 | PHILIPS | 8.72 | 324 |

Figure 5:
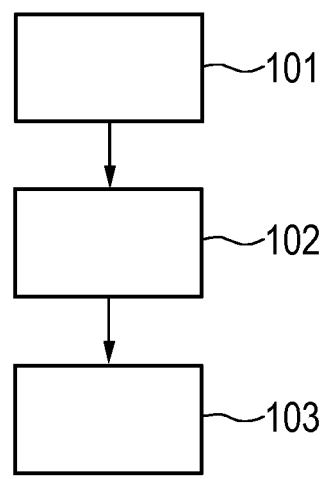
FIG. 5 shows a flowchart exemplarily illustrating an embodiment of a method of operating an LED retrofit lamp for being connected to a high frequency electronic ballast.

In the following, an embodiment of a method of operating an LED retrofit lamp 1 for being connected to a high frequency electronic ballast 26, the high frequency electronic ballast 26 being adapted for providing a voltage and a current to the LED retrofit lamp 1, will be described with reference to the exemplary flowchart shown in FIG. 5.

In step 101, the adapting unit 30 adapts the voltage and the current provided by the high frequency electronic ballast 26 to a voltage and a current for operating an LED unit 4. In step 102, the detecting unit 40 detects an electrical value that depends on the current provided by the high frequency electronic ballast 26. In step 103, the ballast protection unit 60 performs, in dependence of the detected electrical value, an operation for protecting the high frequency electronic ballast 26 from an overcurrent situation.

Figure 6:
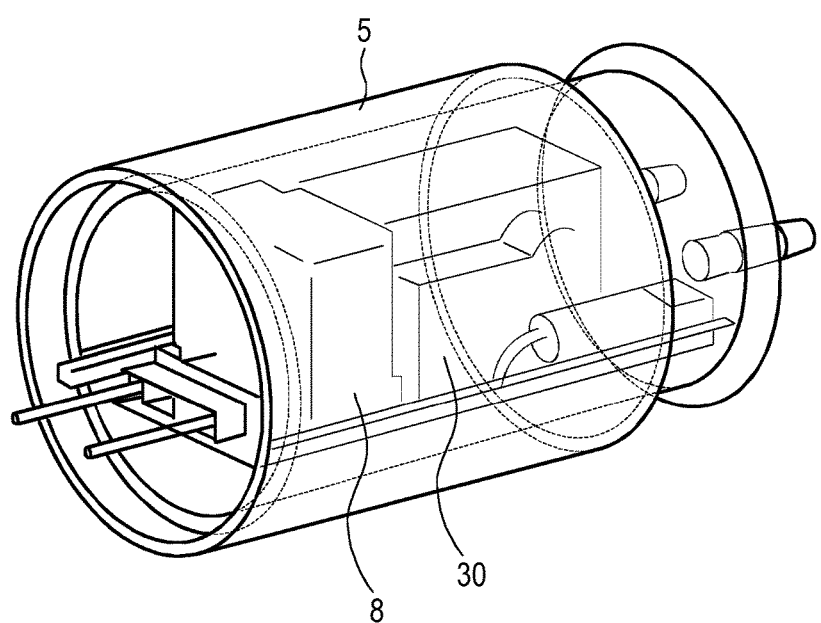
FIG. 6 shows schematically and exemplarily a lamp cap of an LED retrofit lamp.

FIG. 6 shows schematically and exemplarily a lamp cap 5 of an LED retrofit lamp, e.g., the LED retrofit lamp 1 shown in FIG. 1. Here, the lamp cap 5 comprises the LED driver unit 8 as well as the adapting unit 30 for adapting the voltage and the current provided by a high frequency electronic ballast (not shown in the figure) to a voltage and a current for operating the LED unit (also not shown in the figure). Particularly if the adapting unit 30 comprises an LC circuit comprising an inductor and a capacitor and the inductor of the LC circuit is used for detecting an electrical value that depends on the current provided by the high frequency electronic ballast—as has been described above—, a detecting unit and a ballast protection unit can easily and at low cost be realized in the lamp cap 5.

Although in the embodiments of an LED retrofit lamp 1 described with reference to FIGS. 1, 3, 4, and 6 above, the LED retrofit lamp 1 is a replacement for a fluorescent tube lamp, in other embodiments, the LED retofit lamp 1 can also be a replacement for other types of lamps, such as a circular tube lamp or a compact fluorescent lamp (CFL).

Although in the embodiments of an LED retrofit lamp 1 described with reference to FIGS. 1, 3, 4, and 6 above, the ballast protection unit 60 is adapted to electrically disconnect the LED retrofit lamp 1 from the high frequency electronic ballast 26, in other embodiments, the ballast protection unit 60 can also be adapted to perform another operation for protecting the high frequency electronic ballast 26 from an overcurrent situation. For example, the ballast protection unit 60 can be adapted to to change an input impedance of the LED retrofit lamp 1.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations such as the adaptation of the voltage and the current provided by the high frequency electronic ballast to a voltage and a current for operating the LED unit, the detection of an electrical value that depends on the current provided by the high frequency electronic ballast, or the operation for protecting the high frequency electronic ballast from an overcurrent situation, et cetera, performed by one or several units or devices, can also be performed by any other number of units or devices. These operations can at least partially be implemented as program code means of a computer program and/or as dedicated hardware.

Any reference signs in the claims should not be construed as limiting the scope.

The present invention relates to an LED retrofit lamp for being connected to a high frequency electronic ballast, the high frequency electronic ballast being adapted for providing a voltage and a current to the LED retrofit lamp. The LED retrofit lamp comprises an LED unit, an adapting unit for adapting the voltage and the current provided by the high frequency electronic ballast to a voltage and a current for operating the LED unit, a detecting unit for detecting an electrical value that depends on the current provided by the high frequency electronic ballast, and a ballast protection unit for performing, in dependence of the detected electrical value, an operation for protecting the high frequency electronic ballast from an overcurrent situation. This allows avoiding an unsafe situation, such as when the high frequency electronic ballast is overheated.

The invention claimed is:

1. An LED retrofit lamp for being connected to a high frequency electronic ballast, the high frequency electronic ballast being adapted for providing a voltage and a current to the LED retrofit lamp, the LED retrofit lamp comprising:
an LED unit,
an adapting unit configured to adapt the voltage and the current provided to the LED retrofit lamp at the output of the high frequency electronic ballast to a voltage and a current for operating the LED unit,
a detecting unit configured to detect an electrical value that depends on the current provided to the LED retrofit lamp at the output of the high frequency electronic ballast, and
a ballast protection unit configured to perform, in dependence of the detected electrical value, a switching operation to electrically disconnect the adapting unit from the high frequency electronic ballast, such that the high frequency electronic ballast is protected from an overcurrent situation,
wherein the adapting unit comprises an LC circuit comprising an inductor and a capacitor,
wherein the inductor of the LC circuit is inductively coupled to an auxiliary winding and the detected electrical value is a voltage value derived from a voltage across the auxiliary winding.

2. The LED retrofit lamp as defined in claim 1, wherein the detecting unit comprises a rectifier circuit and a buffer capacitor.

3. The LED retrofit lamp as defined in claim 1, wherein the detecting unit comprises a diode configured to absorb transient current spikes supplied by the high frequency electronic ballast to the LED retrofit lamp during a startup state.

4. The LED retrofit lamp as defined in claim 1, wherein the detecting unit comprises a voltage divider circuit.

5. The LED retrofit lamp as defined in claim 1, wherein the detecting unit comprises a low-pass filter circuit comprising a resistor and a capacitor.

6. The LED retrofit lamp as defined in claim 5, wherein the resistor and the capacitor of the low-pass filter circuit form a delay circuit.

7. The LED retrofit lamp as defined in claim 6, wherein a delay of the delay circuit is in a range between 0.02 and 5 seconds.

8. The LED retrofit lamp as defined in claim 1, wherein the ballast protection unit comprises a shunt regulator configured to trigger the operation for protecting the high frequency electronic ballast when the detected electrical value exceeds a predetermined threshold.

9. The LED retrofit lamp as defined in claim 1, wherein the ballast protection unit comprises a relay circuit.

10. The LED retrofit lamp as defined in claim 1, wherein the LED retrofit lamp is an LED retrofit tube lamp.

11. A lighting system, comprising:
a high frequency electronic ballast, and
the LED retrofit lamp as defined in claim 1,
wherein the LED retrofit lamp is connected to the high frequency electronic ballast.

12. A method of operating an LED retrofit lamp for being connected to a high frequency electronic ballast, the high frequency electronic ballast being adapted for providing a voltage and a current to the LED retrofit lamp, wherein the method comprises:
adapting the voltage and the current provided to the LED retrofit lamp at the output of the high frequency electronic ballast to a voltage and a current for operating an LED unit, by an adapting unit comprising an LC circuit comprising an inductor and a capacitor, wherein the inductor is inductively coupled to an auxiliary winding,
detecting an electrical value derived from a voltage across the auxiliary winding that depends on the current provided to the LED retrofit lamp at the output of the high frequency electronic ballast, by a detecting unit, and
performing, in dependence of the detected electrical value, a switching operation to electrically disconnect the adapting unit from the electronic ballast, such that the high frequency electronic ballast is protected from an overcurrent situation, by a ballast protection unit.

13. The method as defined in claim 12, wherein the detecting unit comprises a rectifier circuit and a buffer capacitor.

14. The method as defined in claim 12, wherein the detecting unit comprises a diode configured to absorb transient current spikes supplied by the high frequency electronic ballast to the LED retrofit lamp during a startup state.

15. The method as defined in claim 12, wherein the detecting unit comprises a voltage divider circuit.

16. The method as defined in claim 12, wherein the detecting unit comprises a low-pass filter circuit comprising a resistor and a capacitor.

17. The method as defined in claim 16, wherein the resistor and the capacitor of the low-pass filter circuit form a delay circuit.

18. The method as defined in claim 12, wherein the ballast protection unit comprises a shunt regulator configured to trigger the operation for protecting the high frequency electronic ballast when the detected electrical value exceeds a predetermined threshold.

* * * * *